United States Patent [19]
Wakita

[11] Patent Number: 5,488,538
[45] Date of Patent: Jan. 30, 1996

[54] MOUNTING STRUCTURE FOR MAGNETIC DISK DRIVE

[75] Inventor: Maki Wakita, Sayama, Japan

[73] Assignee: Citizen Watch Co., Ltd., Tokyo, Japan

[21] Appl. No.: 202,000

[22] Filed: Feb. 25, 1994

[30] Foreign Application Priority Data

Mar. 12, 1993 [JP] Japan ............................... 5-016522 U
Mar. 12, 1993 [JP] Japan ............................... 5-016523 U

[51] Int. Cl.6 .............................. G06F 1/16; G11B 33/02; H05K 7/02
[52] U.S. Cl. ......................................................... 361/685
[58] Field of Search ........................ 364/708.1; 360/137; 361/683, 685

[56] References Cited

U.S. PATENT DOCUMENTS 5,067,041  11/1991  Cooke et al. ........................... 361/685

FOREIGN PATENT DOCUMENTS 64-45385  3/1988  Japan .
63-40887  3/1989  Japan .
1-165995  11/1989  Japan .
4-27036  6/1992  Japan .

*Primary Examiner*—Michael W. Phillips
*Attorney, Agent, or Firm*—Oliff & Berridge

[57] ABSTRACT

A structure for mounting a magnetic disk drive applicable to a mount section 12 of an equipment body having different width dimensions. The structure includes a first spacer 20 and second spacer 30. In the case where the mount section 12 coincides with a disk drive 1 in dimensional specifications, the disk drive is fixedly attached to the mount 12 by use of threaded hole 9 provided on lateral sidewalls of a disk drive chassis 5. On the contrary, when the width dimensions differ from each other to cause lateral gaps, spacers 20 and 30 are arranged on each side of the disk drive 1 to thereby adjust the dimensions for the clamping. The structure also includes two top shield covers. The particular cover selected depends upon the relative dimensions of the mount section and the disk drive.

10 Claims, 4 Drawing Sheets

MOUNTING STRUCTURE FOR MAGNETIC DISK DRIVE

BACKGROUND OF THE INVENTION

1. Field of the Invention

The present invention relates to an improved structure for mounting a magnetic disk drive such as a floppy disk drive onto a mount section associated with a system including information processing equipment.

2. Description of the Prior Art

Miniaturization of office automation equipment in recent years has accelerated on an almost daily basis, and also in the field of floppy disk drives there have come into the market a large number of miniaturized and highly dense new models. In particular, the miniaturization and thinning are required of the floppy disk drives containing a 3.5 inch floppy disk. These drives are often contained in A4 or B5 size notebook-type personal computers, word processors or the like. Japanese Utility Model Laid-open Publication H1-165995 discloses a method of mounting a floppy disk drive onto the system side such as information processing equipment, in which a floppy disk drive 101, as shown in FIG. 1, is attached to a mount section 110 of the electronic equipment body, by use of threaded holes 109 formed in the vicinity of terminals of easily deformable mounting sections 110 provided in the form of slits on the lateral side plates of a chassis 105. As a result of an increased demand for miniaturization, as described above, miniaturized new models, which have been marketed in sequence, may bring about inconveniences such as dimensional specifications varying depending on the type of equipment used. A plurality of dimensional specifications W1, L1 on the side of the floppy disk drive and W2, L2 on the side of the equipment body to be mounted with the floppy disk drive may be required. This will lead to an increased demand to mount floppy disk drives having different dimensional specifications in order to increase the flexibility in designing the equipment.

To satisfy the requirements described above, an entire modification of the mounting section of the electronic equipment body or a remake of the chassis of the floppy disk drive must be executed. In such cases, existing stock not available for use. Furthermore, excessive cost is required if the mold must be remade for modification of the mounting section of the body and the chassis of the floppy disk and would result in a higher production cost.

SUMMARY OF THE INVENTION

The present invention was conceived in view of the above problems involved in the prior art. The object is to produce a floppy disk drive having a mounting section with narrower specifications to be mounted onto an electronic equipment body having a mount section with wider specifications, without modifying the mounting section of the equipment body or the mount section of the floppy disk drive.

In order to accomplish the above object, the structure for mounting a magnetic disk drive in accordance with the present invention is capable of selecting mounting member depending on the dimensions of the electronic equipment body to be mounted with this magnetic disk drive, thereby ensuring a mounting even if the dimensional specifications differ from each other.

According to one aspect of the present invention, if the width of the electronic equipment body is coincident with that of the magnetic disk drive, two threaded holes provided on each lateral sidewall of the magnetic disk drive are used to directly mount the magnetic disk drive. If the width of the electronic equipment body is larger than that of the magnetic disk drive, the spacers are used to adjust the width dimensions for attachment. The spacers, which are comprised of first and second spacers, are arranged on each side in pairs. The first spacer is in the shape of an elongated plate, and has at its extremities a couple of through holes at positions opposite to threaded holes provided on the side of the magnetic disk drive. The first spacer has at its central portion a threaded hole for clamping the second spacer. Then, the first spacer is attached to the lateral side of the magnetic disk drive body by means of bolts or screws.

The second spacer is of a cranked shape obtained by bending an elongated plate-like member. The second spacer abuts at its central portion against the first spacer, and abuts at extremities against the mount section of the electronic equipment body. The second spacer has at its central portion a through-hole at the position confronting the threaded hole of the first spacer, and has at its extremities a couple of threaded holes. These threaded holes are provided at the positions confronting the through-holes for mounting the electronic equipment body. By virtue of the thickness of the two spacers, there can be mounted a magnetic disk drive having smaller dimensional specifications onto the electronic equipment body having larger dimensional specifications.

Also, irrespective of difference in dimensions of height, length or width or difference in diameters of setscrews, there can be effected such attachment without requiring any modification in the mounting structure of the magnetic disk drive or the mount section of the equipment body side.

According to another aspect of the present invention, when the electronic equipment body coincides with the magnetic disk drive in width dimensions, a couple of threaded holes provided on each of lateral sidewalls of the magnetic disk drive body are utilized to directly mount the magnetic disk drive. At that time, the top surface of the magnetic disk drive is covered with the first shield cover which has substantially the same depth dimension as that of the magnetic disk drive. On the contrary, if the width dimension of the electronic equipment body is larger than that of the magnetic disk drive, the first shield cover is replaced with the second shield cover which is adapted to cover the top of the magnetic disk drive. The second shield cover is intended to cover the top of the magnetic disk drive and includes an extended section which is laterally extended and whose edges are downwardly bent. The extended section has a couple of threaded holes at positions confronting through-holes provided at mounting positions of the electronic equipment body. As discussed hereinabove, by replacing the top shield cover with one corresponding to larger dimensional specifications, there can be mounted the magnetic disk drive having smaller specifications onto the electromagnetic equipment body having larger dimensional specifications.

Moreover, such attachment can be effected without requiring any modification in the mounting structure of the magnetic disk drive or the mount section of the equipment body even though there is a difference in dimensions of the height or length as well as the width, or setscrews have different diameters.

DESCRIPTION OF THE PREFERRED EMBODIMENTS

Preferred embodiments of the present invention will now be described with reference to the accompanying drawings.

Figure 1:
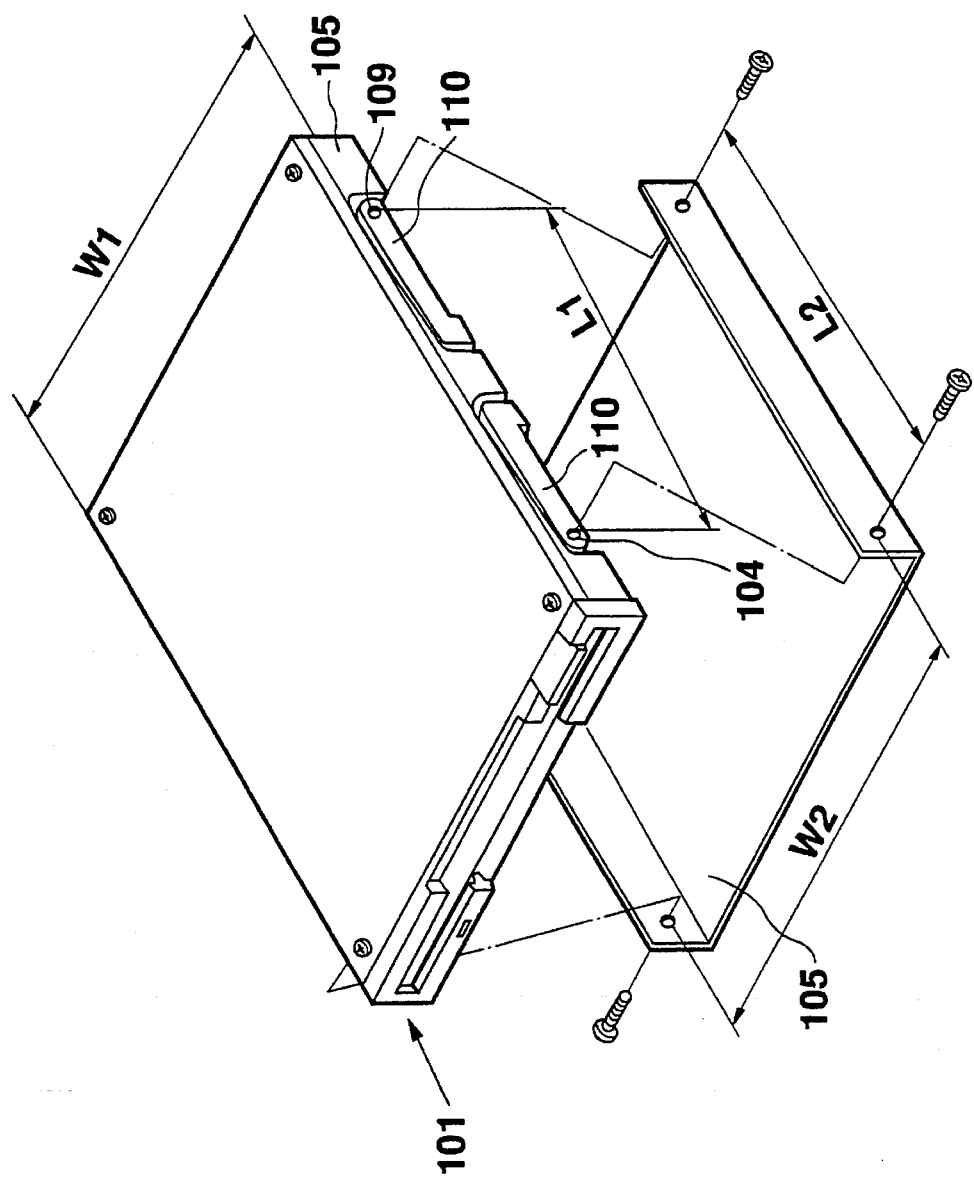
FIG. 1 is an exploded perspective view showing a mounting structure for the conventional floppy disk drive.
Figure 2:
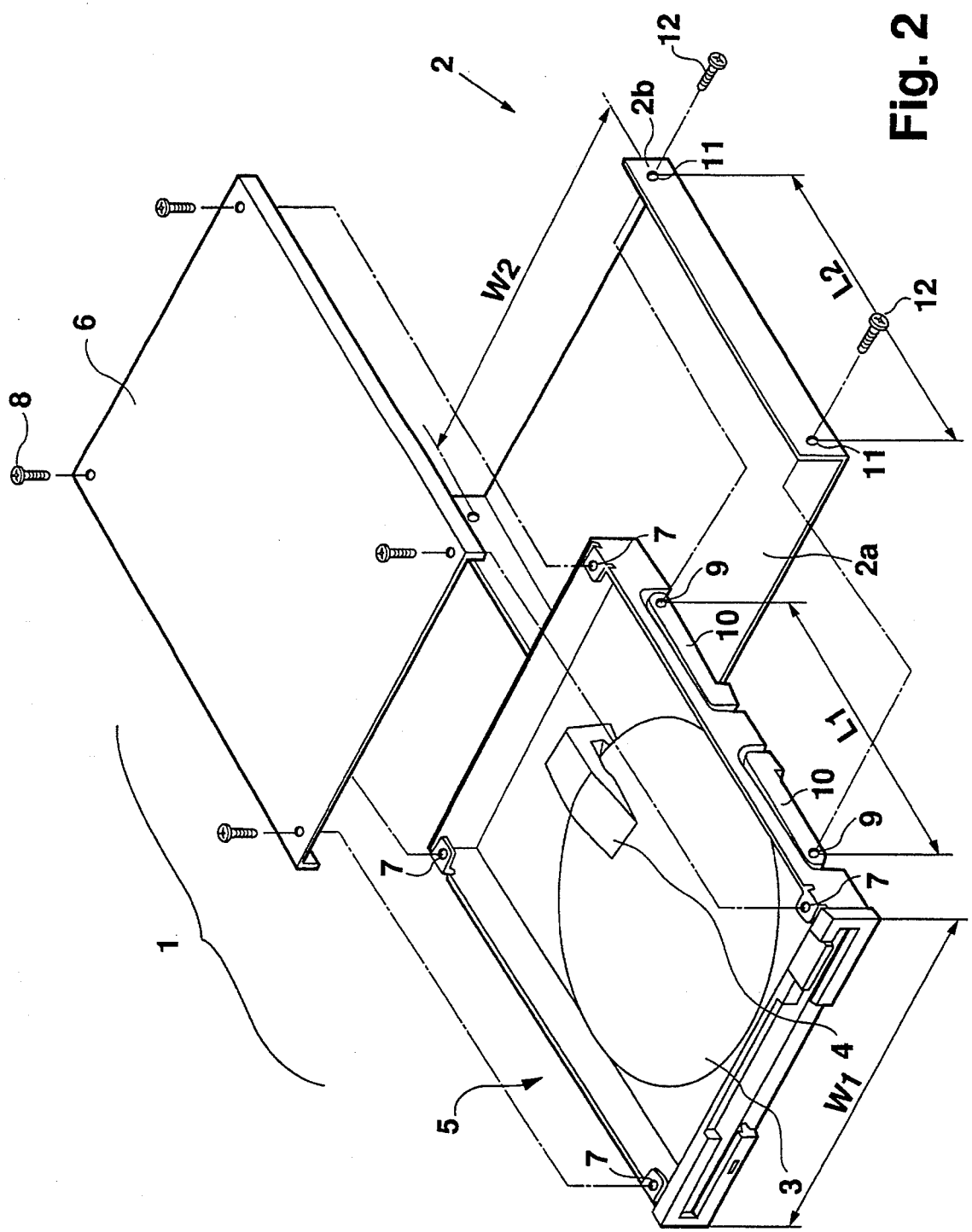
FIG. 2 is an exploded perspective view showing an embodiment of a floppy disk drive in accordance with the present invention, in which the width of the disk drive is coincident with that of the electronic equipment body side.

Referring first to FIG. 2, there are shown a floppy disk drive generally designated at 1 in exploded perspective view and a mount section 2 of an electronic equipment body. This diagram illustrates a case where the floppy disk drive 1 is coincident with the mount section 2 in dimensional specifications. More specifically, a width W1 of the floppy disk drive 1 coincides with a width W2 of the body side, and a mounting span 11 of the floppy disk drive 1 coincides with a mounting span L2 of the body side in FIG. 2, the width (W1, W2) is 96 mm.

Within the interior of the floppy disk drive 1 there is disposed a floppy disk 3 which is rotated by a spindle motor (not shown). The floppy disk 3 is housed in a hard envelope (not shown) so that the floppy disk 3 can be protected from external damage. A head supporter 4 is provided which supports a magnetic head (not shown) for recording information on the floppy disk 3 and reading thus recorded information. The head supporter 4 is movable in the direction of a radius of the floppy disk 3 so that the magnetic head can be moved to a position corresponding to a necessary track on the floppy disk, whereby the magnetic head records and reproduces the information on the track.

The floppy disk drive 1 includes a chassis 5 and a first top shield cover 6, the top opening of the chassis 5 being covered with the first top shield cover 6 so as to prevent dust or the like from adhering to the inner floppy disk 3, magnetic head, etc. The first top shield cover 6 has substantially the same dimensions as those of the chassis 5 in length and width so as not to protrude from the chassis 5. The first top shield cover 6 is fastened to the top surface of the chassis 5 by threaded holes 7 provided in four corners of the chassis 5 and machine screws 8 coacting therewith.

The floppy disk drive 1 includes a pair of mounting sections 10 on each sidewall, that is, four mounting sections 10 in total, each having a threaded hole 9 at its far end with respect to the center of the length of the chassis 5. Each of the mounting sections 10 is, at its proximal end with respect to the center of the chassis length, fastened to the chassis 5, the threaded hole 9 being provided at the distal end of a plate member extending from the thus fastened proximal end in the shape of a tongue. The mounting sections 10 are made of material having a flexibility so as to compensate for a slight dimensional error which may occur between the mount section 2 of the equipment body and the disk drive. Thus, the strain arising from the dimensional error is absorbed so as not to be transmitted to the magnetic disk drive 1.

On the other hand, the mount section 2 of the electronic equipment body side includes a base plate 2a and a pair of side plates 2b, each side plate 2b being provided with a couple of through-holes.

In the case of FIG. 2, since the width of the electronic equipment body side is equal to that of the floppy disk drive side as described earlier, the threaded holes 9 are aligned with the through-holes 11. The floppy disk drive 1 can then be securely attached to the electronic equipment body by means of the machine screws 26.

Figure 3:
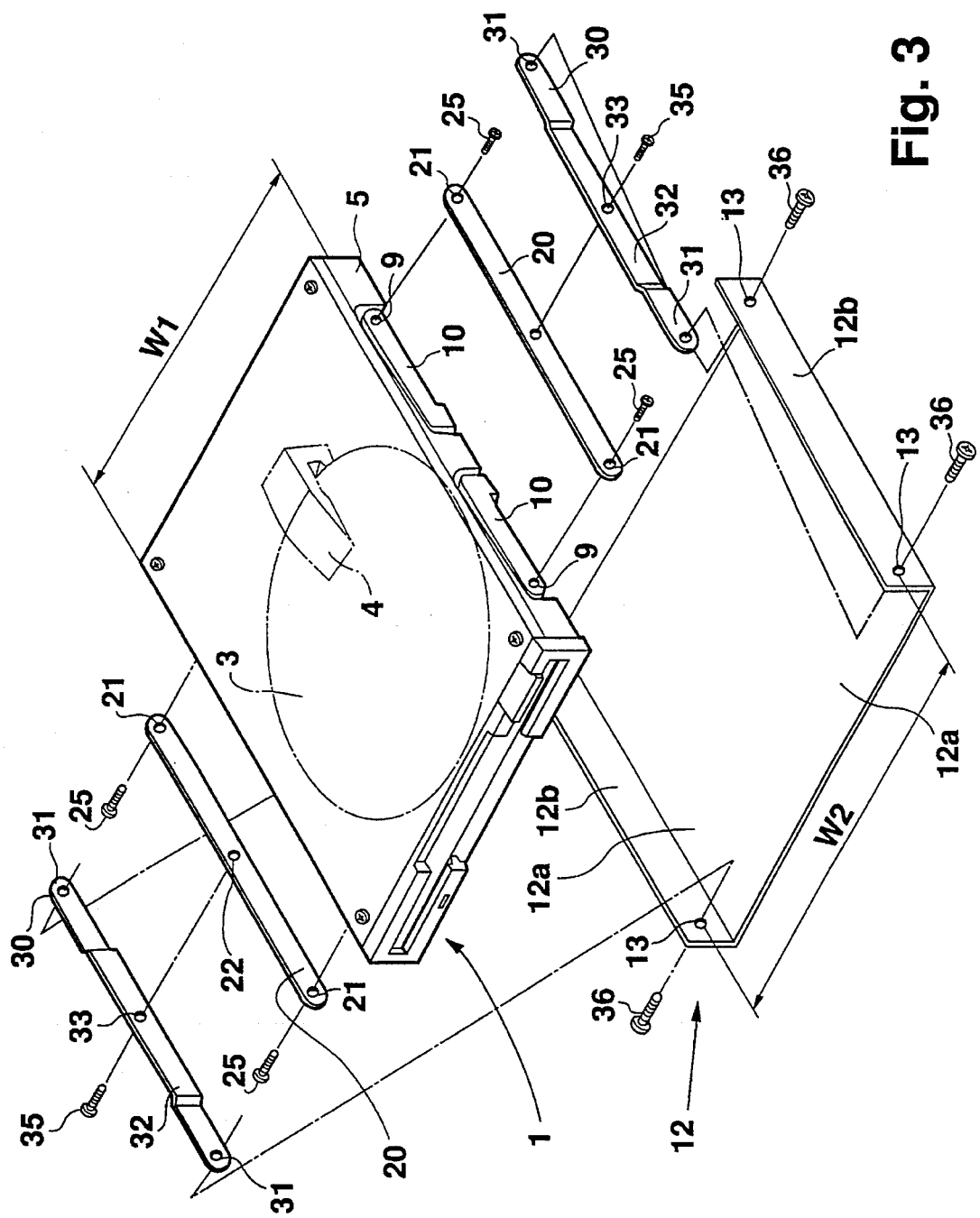
FIG. 3 is an exploded perspective view showing a mounting structure of a case having different width dimensions in the embodiment.

Description will now be given of a structure in which an electronic equipment body mount section 12 having wider dimensional specifications is mounted with a floppy disk drive 1 having narrower dimensional specifications. FIG. 3 depicts the same floppy disk drive as shown in FIG. 2. The same elements of the floppy disk drive 1 as the ones shown in FIG. 2 are referenced by identical numerals, and the description thereof will be omitted. The width W2 of the mount section 12 being 101.6 mm is larger than the width W1 of the floppy disk drive 1 being 96 mm. The mount section 12 has substantially the same constitution as the mount section 2 shown in FIG. 2 except for different width W2. The mount section 12 includes a base plate 12a and a pair of side plates 12b provided on both edges of the base plate 12a and each having a couple of through-holes.

in the unit shown in FIG. 3, as described above, the mount section 12 is different in width from the floppy disk drive 1, and first and second spacers 20, 30 are used to adjust this difference. The first spacer 20 has at its terminals a couple of through-holes 21 corresponding to threaded holes 9, and at its central portion a threaded hole 22 for fastening the second spacer 30 thereto. The second spacer 30 has at its terminals a couple of threaded holes 31 corresponding to a pair of through-holes 13 provided in the mount section 12 of the equipment body side. The second spacer 30 further has at its central portion a cranked protuberance 32 so as to compensate for the difference between the width of the body side mount section 12 being 101.6 mm and the width of the floppy disk drive 1 mounting section 10 being 96 mm, the protuberance 32 including at its center a through-hole 33 corresponding to the threaded hole 22 of the first spacer 20.

A manner of mounting the floppy disk drive 1 onto the mount section 12 will now be described with reference to FIG. 3. Firstly, the first spacer 20 is screwed onto the mounting sections 10 provided on both sides of the floppy disk drive 1, by screwing screws 25 through the through-holes 21 of the spacer 20 into the threaded holes 9 of the mounting sections 10. Secondly, the second spacer is screwed onto the first spacer which has already been screwed to the floppy disk drive 1, by screwing a screw 35 through the through-holes 33 of the second spacer 30 into the threaded hole 22 of the first spacer 20. Lastly, the floppy disk drive 1, which has been screwed with the first 20 and second 30 spacers, is securely attached to the mount section 12 of the equipment body side. The attachment is accomplished by screwing screws 36 through the through holes 13 provided in the mount section 12 into the threaded holes 31 of the second spacer 30.

According to the embodiment described above, even though the width of the mounting sections 10 of the floppy disk drive 1 is smaller than the width of the mount section 12 of the electronic equipment body side, the floppy disk drive 1 can be firmly secured to the mount section 12 of the electronic equipment body side without requiring any modification in structure of the mounting section 10 or the mount section 12 merely by adjusting the first spacer 20 and the second spacer 30.

Figure 4:
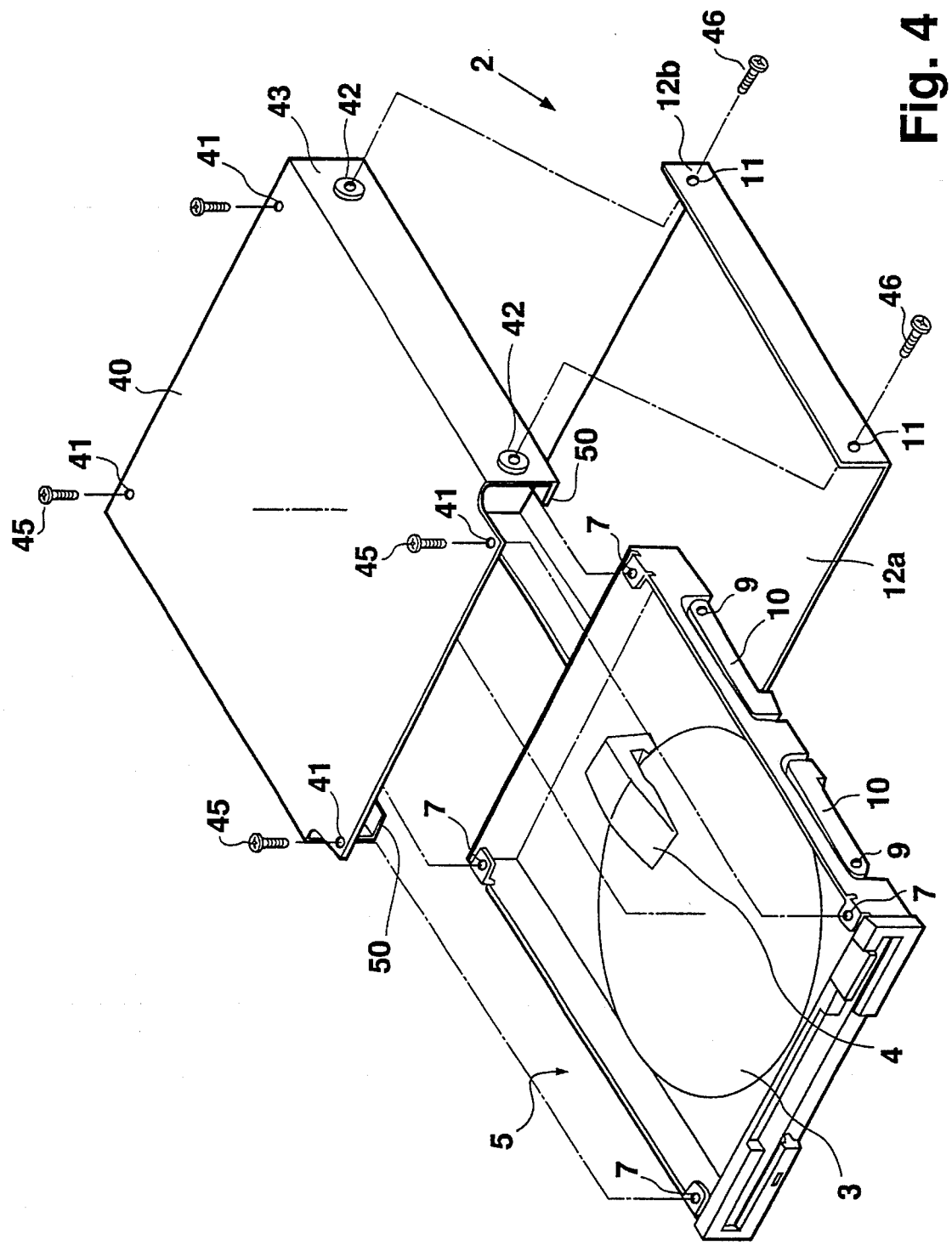
FIG. 4 is an exploded perspective view showing another embodiment.

Referring next to FIG. 4, there is shown a further embodiment of the present invention. In this embodiment, the top shield cover of the floppy disk drive is replaced with another for the dimensional adjustment, when the floppy disc drive differs in dimensional specifications from the mount section of the equipment body side. More concretely, the first top shield cover 6 shown in FIG. 2 is replaced with a second top shield cover 40 as shown in FIG. 4. It is to be noted in FIG. 4 that identical reference numerals are conferred on the same constituent elements as those shown in FIGS. 2 and 3, and hence the description thereof will be omitted. The second shield cover 40 has through-holes corresponding to threaded holes 7 provided on a chassis 5 at its four corners, and has threaded holes 42 for the attachment to a mount section 2 of the equipment body side.

The second shield cover 40 further includes an extended section 43, which has a width larger than that of the chassis 5, and is in conformity with the dimensional specifications of the mount section 2 of the equipment body. The edges of the second shield cover are bent downward. The threaded holes 42 are provided on this bent portion confronting the through-holes 13 of the mount section 12 of the body side. This extended section 43 is readily deformable in the same manner as the mounting sections 10 of the chassis 5 so as to absorb the strain to thereby prevent a deformation of the chassis 5.

With reference to FIG. 4 there will now be described a manner of mounting the floppy disk drive 1 onto the mount section 12 of the electronic equipment body side. Firstly, the second top shield cover 40 is attached to the chassis 5 of the floppy disk drive 1 by screwing the screws 45 through the through-holes of the second top shield cover 40 into the threaded holes 7 of the chassis 5. Then the chassis 5 mounted with the second top shield cover 40 can be attached to the mount section 12 of the equipment body side by screwing the screws 46 through the through-holes 13 provided on lateral mount plate 12b of the mount section 12 of the equipment body side. Also, in the case where the through-holes 13 are provided in the base plate 12a due to the structure of the mount section of the body side, threaded holes 51 may be provided in fold-back portions (designated at 50 in the diagram) which is obtained by further inwardly folding the edge of the extended section.

According to this embodiment, even though the width of the mounting section 10 of the floppy disk drive 1 is smaller than that of the mount section 12 of the equipment body side, the floppy disk drive 1 can be attached to the electronic equipment body without requiring any modification in the structure of the mounting section 10 or the mount section 12, merely by using the second top shield cover 40 having the extended section 43 corresponding to the width of the mount section 12. The same procedure as described above applies to the case in which a difference in height or length exists. It will be appreciated that this invention is applicable to the mounting structures for a variety of magnetic disk drives without being limited to the floppy disk drive shown in the above embodiments.

What is claimed is:

1. A system for mounting a magnetic disk drive onto an electronic equipment body having mounting holes, said system comprising:

a magnetic disk drive body having at each lateral sidewall a couple of threaded holes;

a first spacer arranged adjacent each sidewall of said magnetic disk drive body and having a single threaded through-hole and a couple of throughholes at positions immediately confronting said couple of threaded holes provided on each lateral sidewall of said magnetic disk drive body; and a second spacer adjacent said first spacer, said second spacer having a single through-hole at a position immediately confronting said single threaded-hole of said first spacer, said second spacer having a couple of threaded holes at positions immediately confronting mounting holes on said electronic equipment body;

wherein, when said electronic equipment body has the same lateral dimensions as said magnetic disk drive, said magnetic disk drive is mounted onto said electronic equipment body by directly screwing bolts or machine screws into threaded holes of mounting members, and where said electronic equipment body has larger lateral dimensions than said magnetic disk drive, the attachment to said electronic equipment body being effected by way of said first and second spacers.

2. A structure for mounting a magnetic disk drive according to claim 1, wherein said first spacer has an elongated plate-like shape and has at its terminals said couple of through-holes and at its central portion said threaded hole.

3. A structure for mounting a magnetic disk drive according to claim 1, wherein said second spacer presents a cranked shape obtained by bending an elongated plate member, and has at its terminals said couple of through holes and at its central portion said threaded hole, and wherein said second spacer abuts at its central portion against said first spacer, and abuts at its terminals against said electronic equipment body.

4. A system for mounting a magnetic disk drive having two lateral sidewalls onto an electronic equipment body having lateral dimensions larger than lateral dimensions of the magnetic disk drive, said system comprising:

first spacing means for spacing said magnetic disk drive from said electronic equipment body, said first spacing means located adjacent each of said two lateral sidewalls, said first spacing means having first terminal engagement means for engagement with said magnetic disk drive body and first central engagement means, and second spacing means for spacing said magnetic disk drive from said electronic equipment body, said second spacing means located adjacent each said first spacing means, said second spacing means having second terminal engagement means engageable with said electronic equipment body and second central engagement means for engagement with said first spacing means through said first central engagement means.

5. The system of claim 4, wherein said first spacing means comprises an elongated plate and said first central engagement means comprises a central threaded through-hole.

6. The system of claim 5, wherein said first terminal engagement means comprises a first through-hole at a first end of said plate and a second through-hole at a second end of said plate.

7. The system of claim 5, wherein said magnetic disk drive body has two threaded holes alignable with the first and second through holes of said first spacing means.

8. The system of claim 4, wherein said second spacing means comprises a plate having a central section and two peripheral sections, said central section located on a plane parallel to said peripheral sections.

9. The system of claim 8, wherein said second central engagement means comprises a central threaded hole in said central section and said second terminal engagement means comprises a threaded hole in each of said two peripheral sections at positions remote from said central section.

10. The system of claim 9, wherein each said threaded hole in the peripheral portions of said second spacing means aligns with a mounting hole in said electronic equipment body.

* * * * *